G. W. BULLEY.

RUBBER WORKING MACHINE.

APPLICATION FILED MAR. 10, 1917.

1,323,213.

Patented Nov. 25, 1919.

Witness:
R. L. Farrington

Inventor,
George W. Bulley,
By Brown Nissen & Sprinkle
Attys.

G. W. BULLEY.

RUBBER WORKING MACHINE.

APPLICATION FILED MAR. 10, 1917.

1,323,213. Patented Nov. 25, 1919.

Witness:

R. L. Farrington

Inventor.

George W. Bulley,

By Brown Nissen & Sprinkle Attys.

UNITED STATES PATENT OFFICE.

GEORGE W. BULLEY, OF CHICAGO, ILLINOIS.

RUBBER-WORKING MACHINE.

1,323,213. Specification of Letters Patent. Patented Nov. 25, 1919.

Application filed March 10, 1917. Serial No. 153,831.

*To all whom it may concern:*

Be it known that I, George W. Bulley, a citizen of the United States, residing at Chicago, in the county of Cook and State of Illinois, have invented certain new and useful Improvements in Rubber-Working Machines, of which the following is a specification.

My invention relates to mixing machines, and more particularly to machines which are adapted for mixing and compounding rubber, and the like.

One object of my invention is the provision of a machine of the character mentioned which is adapted to mix the ingredients for making a rubber compound into a homogeneous mass, or one in which each of the ingredients of the compound is thoroughly distributed throughout all of the other ingredients making up such compound.

A further object is the provision of such a machine in which there are parts capable of returning the material after once passing through the mixing machine proper back to the mouth of such machine for refeeding the material into the machine again in order to effect a thorough mixture of the compounding ingredients.

A still further object is the provision of means for controlling the temperatures of the machine and material in use.

Other objects will appear hereinafter.

Embodiments of my invention are illustrated in the accompanying drawings, forming a part of this specification, and in which—

In the manipulation of rubber and forming it into its compounds, it is necessary to bring all of the particles of rubber into contact with all of the other ingredients used in the compound. Owing to the peculiar properties of rubber this requires considerable manipulation of the materials to effect a homogeneous mass, or to thoroughly distribute the other ingredients throughout the rubber. This is sometimes accomplished by passing the rubber and other ingredients through the mixing rolls a number of times and requires more or less skilled labor.

Figures 1, 2:
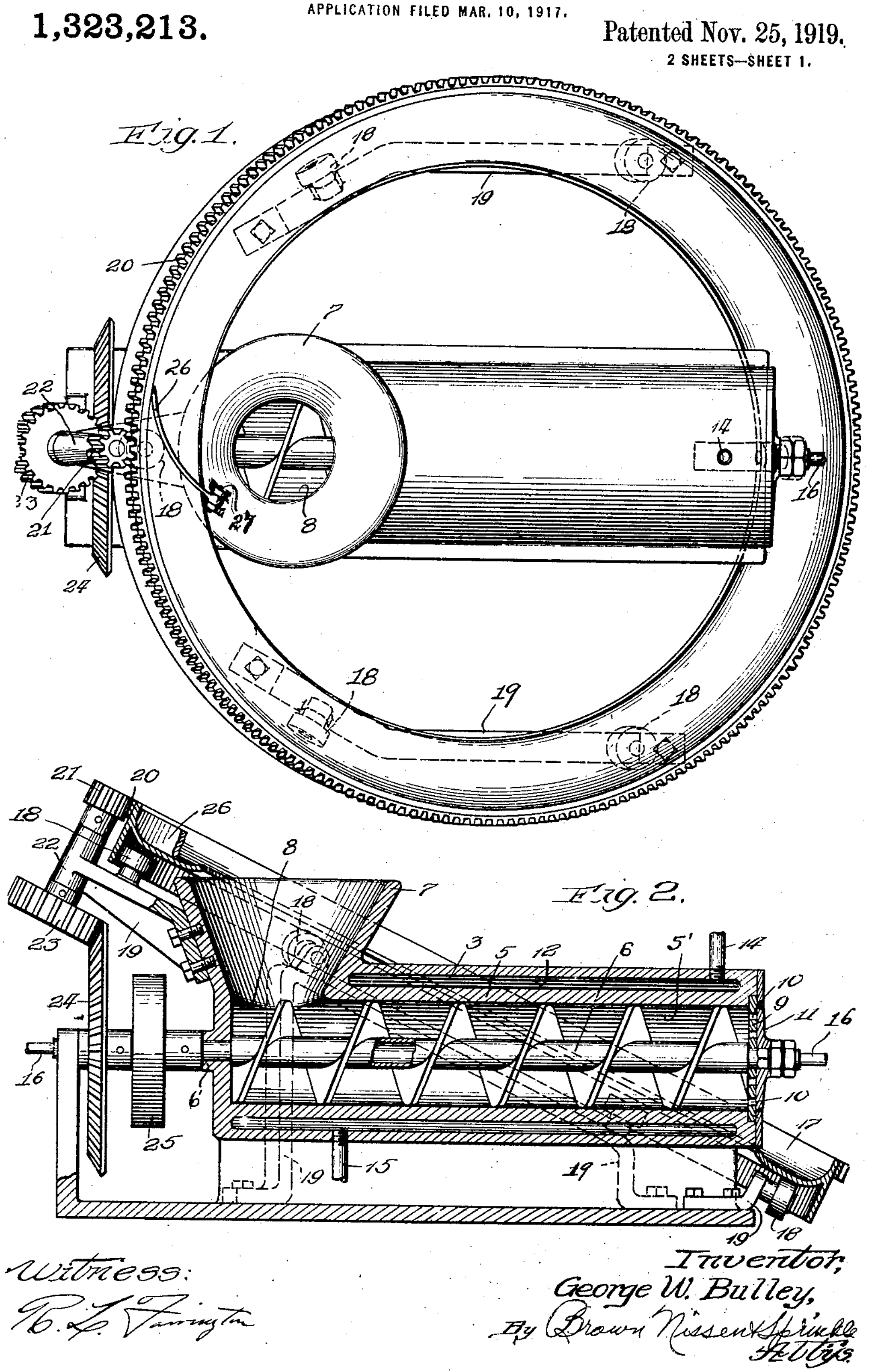
Figure 1 is a plan view of one form of rubber-working machine embodying my invention.
Fig. 2 is a longitudinal section taken through such a rubber-working machine.
Figure 3:
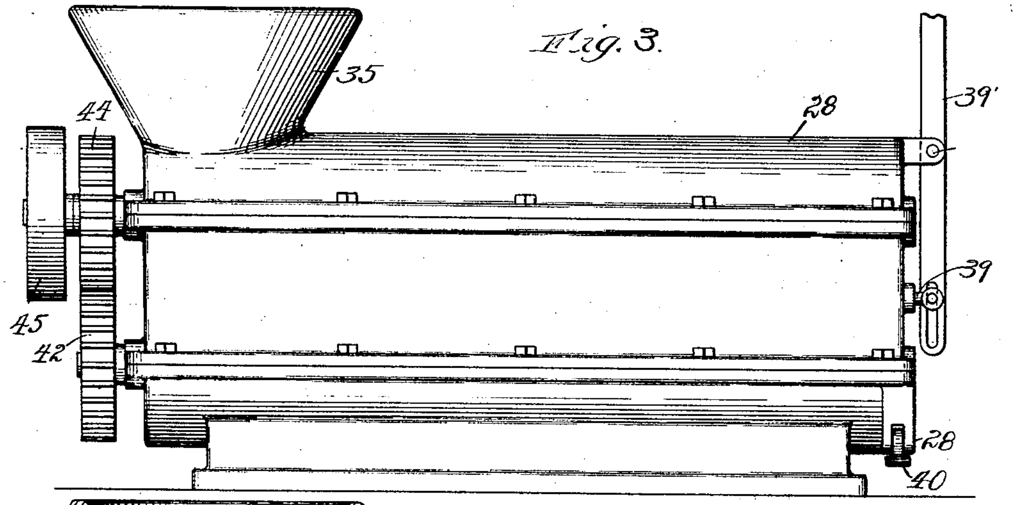
Fig. 3 is a side elevation of another form of rubber-working machine embodying my invention.
Figures 4, 5, 6:
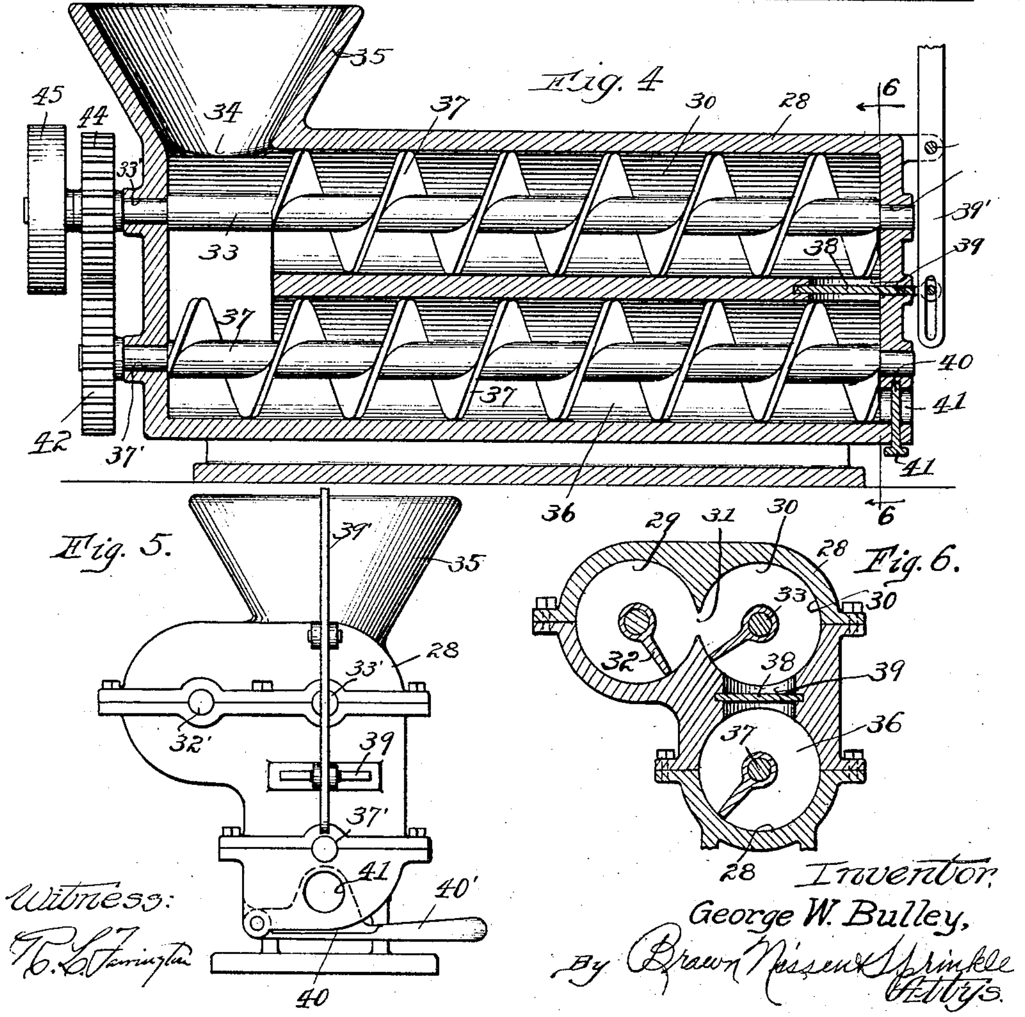
Fig. 4 is a longitudinal section of the same.
Fig. 5 is a rear end view of the same.
Fig. 6 is a section taken on line 6—6 of Fig. 4.

Referring more particularly to the form of machine shown in Figs. 1 and 2, I have indicated a rubber-working machine of conventional form for accomplishing the main part of the mixing. This conventional form of rubber-working machine comprises a casing 5, having a cylindrical chamber 5′ therein, and in said chamber is mounted a screw member 6 which is journaled in a bearing 6′ at the feeding end of the machine. The casing is provided with a receiving hopper 7 which opens through a feed opening 8 into the chamber 5′ to permit the materials to be fed into operative relation with the interior of casing 5 and screw member 6.

The screw member 6 is adapted to rotate and force the materials through the chamber 5′. In such movement of the materials they engage the inner wall of casing 5 and adhere somewhat thereto and to the screw member, thereby causing such materials to be torn apart and brought together in different places again, effecting more or less mixture of the materials. The discharge end of chamber 5′ is closed by a die member 9 having perforations 10 therein through which the material is forced by the screw member 6.

In some instances it is desirable to permit the rubber compound materials to come through the holes or perforations 10 and be discharged from the machine in small strings or streams. In other instances it may be desirable to cut these small strings into small particles. In the latter case I prefer to use a knife member 11 which is fixed on the spindle of screw member 6 and revolves over the outer ends of the openings 10 to cut the streams of material coming through openings 10 into small particles. In rubber-mixing machines considerable heat is developed due to the friction of the materials in the machine. In order to control the temperatures resulting from such friction, I provide a water-jacket 12 around the casing 5 on larger sizes of machines. In small machines of this character such water-jacket will not be necessary. The water- . has
r 26
into
e the
the
this
evice
s ac-
ns or
le 17
these
other nclu-
ch is
ther.
cas-
nan-
with
. are
cent
rs 29
d 33
nam-
mix-
. out
vide
from
sing
come
with
sing.
ably
pted
r to
aster
tates
rials
: defeed
itate
The
nber
nber
ch a
ma-
dis-
gate
; the
ma-
nber
by
pen-
such
ma-
rs 29
ated.
ated
l the
e 38
the
ting
rials
nine.

It will thus be seen that with a machine of the class just described the mixing may be carried on to any desired degree and then discharged from the machine without attention on the part of an attendant, except to feed the materials into the machine.

While I have illustrated and described the preferred forms of construction of my invention, I do not desire to be limited to these precise forms, but desire to avail myself of such variations and changes as come within the scope of the appended claims.

I claim:—

1. In a rubber working machine, the combination of a tubular casing having a receiving opening and a discharge opening, a rotary screw mixing mechanism for the material extending axially of said tubular casing, a rotary conveyer extending between and adjacent said openings to take the material from the discharge opening and to the receiving opening, and driving mechanism for the mixing mechanism and the conveyer.

2. In a rubber-working machine the combination of a casing having a rotary mixing screw therein and having a receiving opening and a discharge opening; a mixing member extending between said opening and operating as a conveyer to carry material from the discharge opening to the receiving opening; driving means for said member; and means for diverting the material from said member into said receiving opening.

3. In combination, a rubber-working machine having receiving and discharge openings; a mixing mechanism disposed to carry material from the discharge opening to the receiving opening and to mix the material while in transit; driving means for said mixing mechanism; and a device associated with said mixing mechanism and receiving opening for diverting the material from said mixing mechanism into said receiving opening.

4. In combination, a rubber-working machine having receiving and discharge openings; a rotating table encircling said machine adjacent said openings operating to receive material from the discharge opening and convey it to the receiving opening; and means adjacent said receiving opening and coöperating with said table for directing the material from the table into said opening.

5. In combination, a rubber-working machine having receiving and discharge openings; an annular rotating table with portions adjacent said openings so as to receive and carry material from the discharge opening to the receiving opening, whereby the table will receive layer upon layer from said discharge opening; means for operating said annular table; and a deflector associated with the annular table adjacent the receiving opening for diverting the layers of material from the latter into said receiving opening.

6. In combination, a rubber-working machine having receiving and discharge openings; an annular rotary conveyer table encircling said machine; mounts carrying said annular table and supporting a portion of the latter above the receiving opening and another portion below the discharge opening; means for rotating the said table constantly in one direction; and a scraper associated with said table and receiving opening adapted to scrape material from said table; into said receiving opening.

7. In combination, a rubber-working machine having receiving and discharge openings therein; a rotating table conveyer associated with said openings adapted to carry materials from said discharge opening to said receiving opening, parts of said materials being brought together with other parts thereof upon being discharged onto said table as it rotates; and means for operating said table and rubber-working machine simultaneously.

8. The combination of a tubularly chambered casing having a feeding mouth and an orifice for the discharge of the material, an annular rotating table disposed in feeding relation to said feeding mouth and arranged to receive a stream of material from the discharge orifice and cause the material to be laid layer upon layer whereby to bring remote portions of the material into relative contiguity, and means for diverting the material from said table into the feeding mouth.

In testimony whereof I have signed my name to this specification.

GEORGE W. BULLEY.